(12) United States Patent
May

(10) Patent No.: US 9,616,955 B2
(45) Date of Patent: Apr. 11, 2017

(54) GOLF BIKE

(71) Applicant: Todd May, Tallahassee, FL (US)

(72) Inventor: Todd May, Tallahassee, FL (US)

( * ) Notice: Subject to any disclaimer, the term of this patent is extended or adjusted under 35 U.S.C. 154(b) by 0 days.

(21) Appl. No.: 14/161,110

(22) Filed: Feb. 18, 2014

(65) Prior Publication Data

US 2015/0232143 A1 Aug. 20, 2015

(51) Int. Cl.
*B62J 7/04* (2006.01)
*B62J 9/00* (2006.01)
*B62K 3/02* (2006.01)

(52) U.S. Cl.
CPC ............... *B62J 7/04* (2013.01); *B62J 9/001* (2013.01); *B62K 3/02* (2013.01)

(58) Field of Classification Search
CPC ....... B62K 2005/002; B62J 11/00; B62J 7/04; B62J 9/001
See application file for complete search history.

(56) References Cited

U.S. PATENT DOCUMENTS

| | | | | |
|---|---|---|---|---|
| 3,827,613 A | * | 8/1974 | Meyer | 224/457 |
| 4,450,988 A | * | 5/1984 | Meisel | 224/430 |
| 4,770,326 A | * | 9/1988 | Thompson | 224/418 |
| 5,340,003 A | * | 8/1994 | Wilson | 224/415 |
| 7,621,548 B2 | * | 11/2009 | Weber | 280/288.4 |
| 7,870,985 B2 | * | 1/2011 | King et al. | 224/413 |
| 2003/0209581 A1 | * | 11/2003 | Adams | 224/413 |
| 2007/0138223 A1 | * | 6/2007 | Brown | 224/413 |
| 2008/0035691 A1 | * | 2/2008 | Losos | 224/429 |

* cited by examiner

*Primary Examiner* — Kevin Hurley
(74) *Attorney, Agent, or Firm* — William Holliman

(57) ABSTRACT

A golf bike including frame geometry and wheel design that facilitates the use of a bicycle as a golf club carrying vehicle on a golf course. A club carrying frame is incorporated into the golf bike to receive a bifurcated golf bag for holding clubs and appurtenant accessories.

2 Claims, 6 Drawing Sheets

GOLF BIKE

STATEMENT REGARDING FEDERALLY SPONSORED RESEARCH OR DEVELOPMENT

Not Applicable

MICROFICHE APPENDIX

Not Applicable

CROSS REFERENCE TO RELATED APPLICATIONS

Not Applicable

BACKGROUND OF THE INVENTION

Field of the Invention

This invention relates to the field of apparatuses for transporting golf clubs. More specifically, the present invention relates to a specially configured bicycle and an apparatus attachable to the bicycle that allows for the easy transportation of golf clubs by a bicycle on a golf course.

SUMMARY OF THE INVENTION

Golf bags are the traditional vessel for carrying golf clubs. Because golf bags are heavy and cumbersome, they can be difficult to carry. Hence, many types of carts, carriers, and the like have been developed to ease the transportation of golf clubs around a golf course. Generally, there are rolling carriers into which a standard golf bag fits that are pulled or pushed by a player, or that may include an electric motor. Many players opt to use a golf cart, which is a motorized vehicle that typically stores clubs in a rear area, and provides a seating/driving area forward of the club storage area.

One criticism of the game of golf is that it simply takes too long to complete a round. Even with a motorized cart, it can take many hours to complete a round. Further, using a motorized cart significantly reduces the amount of exercise a player obtains in completing a round. On the other hand, walking while carrying a full golf bag, particularly in warm weather, is both slow and exhausting.

Thus, there is a need for an apparatus that allows for the efficient transportation of golf clubs around a golf course, that speeds a player's progress around the golf course, and that provides a player with an opportunity to obtain exercise. The present invention meets these needs by providing a rack system that is attachable to a specially configured bicycle, that allows a player to carry a full complement of clubs on a bicycle. Preferably, the bike includes frame geometry, wheel sizing, gearing, and other specialized features that allow the safe and efficient operation of the bicycle on a golf course. Optionally, the bike can include an electric assist.

This summary provides, in simplified forms, concepts that are more fully described and detailed below. This summary is not intended to identify key features or essential features of the claimed subject matter, nor is this summary intended to be used as an aid in determining the scope for the claimed subject matter. Additional features and advantages of the invention will be set forth in the following description, or may be learned by the practice of the invention. The features and advantages of the invention may be realized and obtained by means of the appended claims. These and other features of the present invention will become more fully apparent from the following description and appended claims, or may be learned by the practice of the invention as set described in this application.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
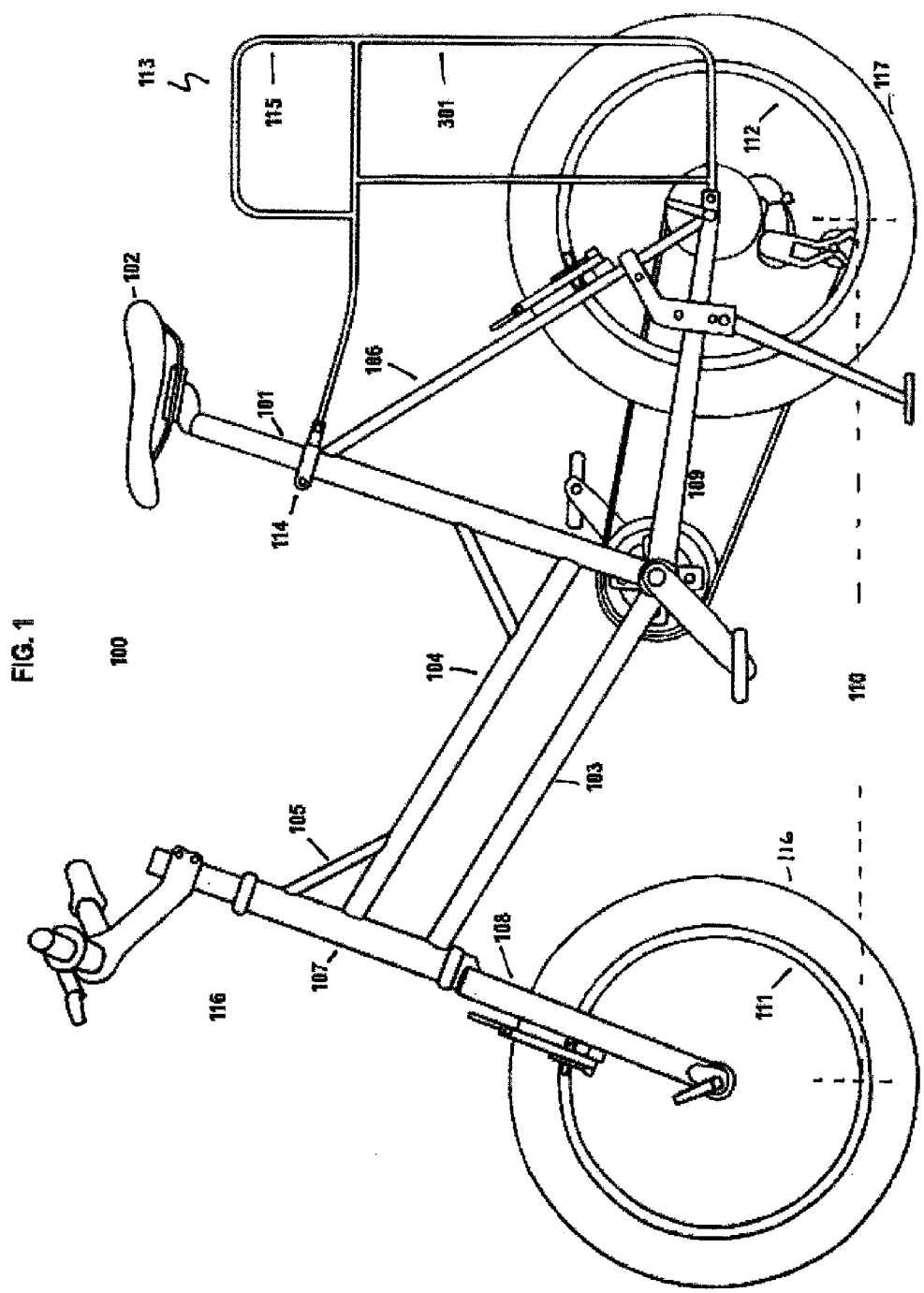
FIG. 1 is a side view of an embodiment of the present invention.

As illustrated in FIG. 1, golf bike 100 is comprised of a bike component 116 to which a club carrying frame 113 is attached. Golf bike 100 is specially adapted to both carry golf clubs, and associated accessories, and to operate effectively as a bicycle on a golf course. Because golf bike 100 is to be used on soft surfaces such as turf grass and will carry a load at the rear of the bike 114, certain adaptations are required. The wheelbase 110 of golf bike 100 is increased from the wheelbase of a standard bike. The increased wheelbase provides additionally stability on hills and acts to inhibit golf bike 100 from pulling "wheelies," i.e., having the front wheel come off the ground, either because of the weight associated with a load attached to club carrying frame 113 or because of a rider accelerating golf bike 100. Preferably, wheelbase 110 is in the range of 114 to 121 centimeters, with a preferred embodiment having a wheelbase 110 of 117 centimeters.

Top tube 104 extends between seat tube 101 and head tube 107 and is more or less parallel to down tube 103. Top tube 104 is positioned to provide a "step through" frame, to facilitate mounting and dismounting of golf bike 100 by a user. The mid point of top tube 104 is at a height from ground in the range of 21 to 26 inches, with a preferred embodiment having a height above ground of 24 inches.

Figure 2:
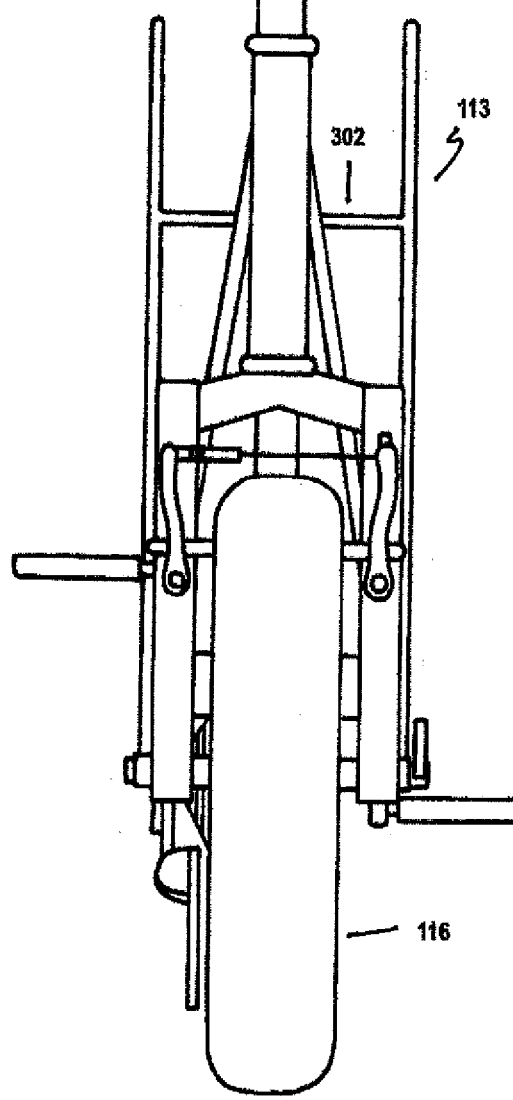
FIG. 2 is a front view of an embodiment of the present invention.
Figure 3:
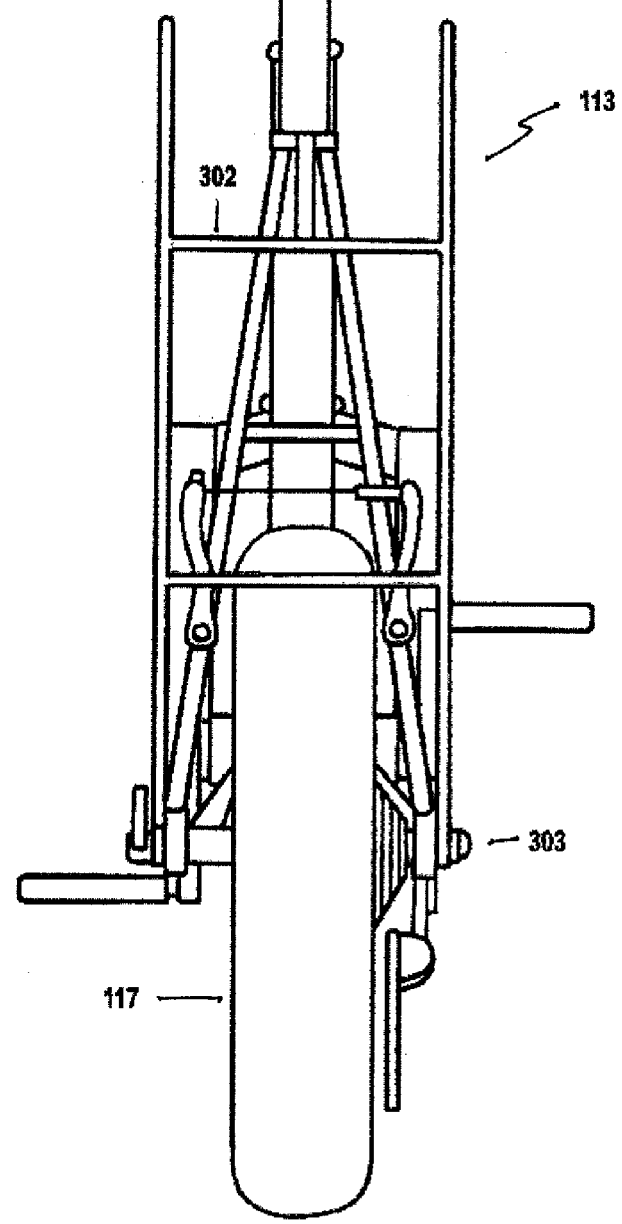
FIG. 3 is a rear view of an embodiment of the present invention.

As seen in FIGS. 1 and 2, front wheel 111 is positioned at the front of golf bike 100. Because golf bike 100 is to be used on soft surfaces such as turf grass, and it is necessary that golf bike 100 not damage such turf grass, it is necessary for front wheel 111 and rear wheel 112 to have sufficient surface area in contact with the turf grass such that the combined weight of golf bike 100 and its user are distributed in a manner that does not cause rutting of the turf grass to occur. Accordingly, front wheel 111 and rear wheel 112 have a width that is preferably in the range of 2.0 to 3.0 inches, with a preferred embodiment having a width of three inches. Front wheel 111 and rear wheel 112 are of conventional design for bicycle wheels with an outer tire over an inner tube that holds air. Front tire 116 and rear tire 117 have a width of 2.5 to 3.5 inches, with a preferred embodiment having a width of 3 inches. To increase maneuverability on a golf course, front wheel 111 and rear wheel 112 have a smaller diameter than the tires on a typical road or mountain bike. Preferably, front wheel 111 and rear wheel 112 have a diameter in the range of 16 to 24 inches, with a preferred embodiment having a diameter of 20 inches.

Figure 6:
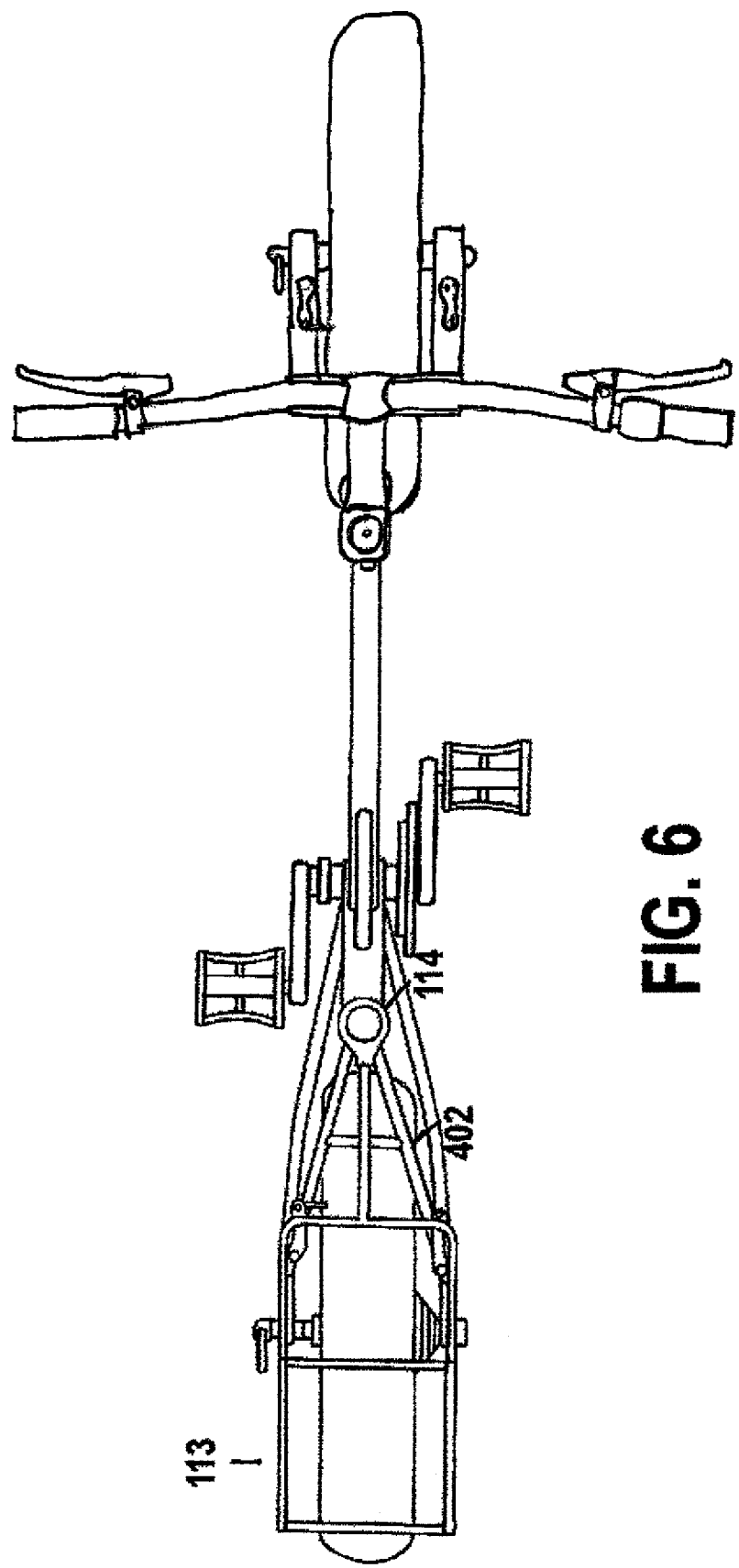
FIG. 6 is a top view of an embodiment of the present invention.

Referring to FIG. 1 and FIG. 6, club carrying frame 113 is comprised of a roughly rectangularly shaped upper platform 302 that is positioned above rear tire 117 and that is connected to and supported by a pair of vertical supports 301 that extend above and below upper platform 302. Upper platform 302 further includes a pair of upper platform extensions 402 that extend from upper platform 302 and connect to seat tube clamp 114. Vertical supports 301 are generally U-shaped, with the upper, open end of the U connected to upper platform 302. The lower portion of vertical supports 302 are positioned on either side of rear wheel 112 and are positioned rearward from rear axle 303. The lower, inward portion of each vertical support 301 are connected to rear axle 303. One or more intermediate stays 304 extend horizontally between each vertical support 301 below the level of upper platform 302.

Figure 4:
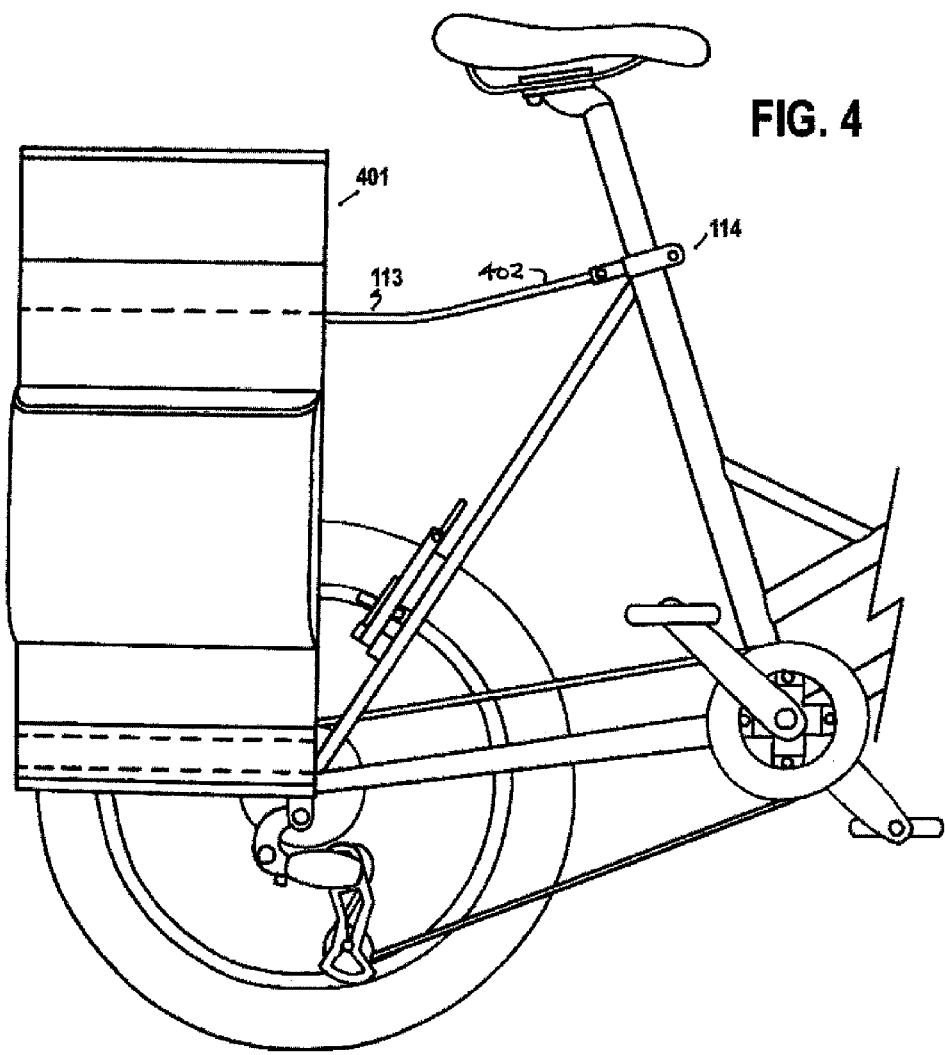
FIG. 4 is a rear side view of an embodiment of the present invention.
Figure 5:
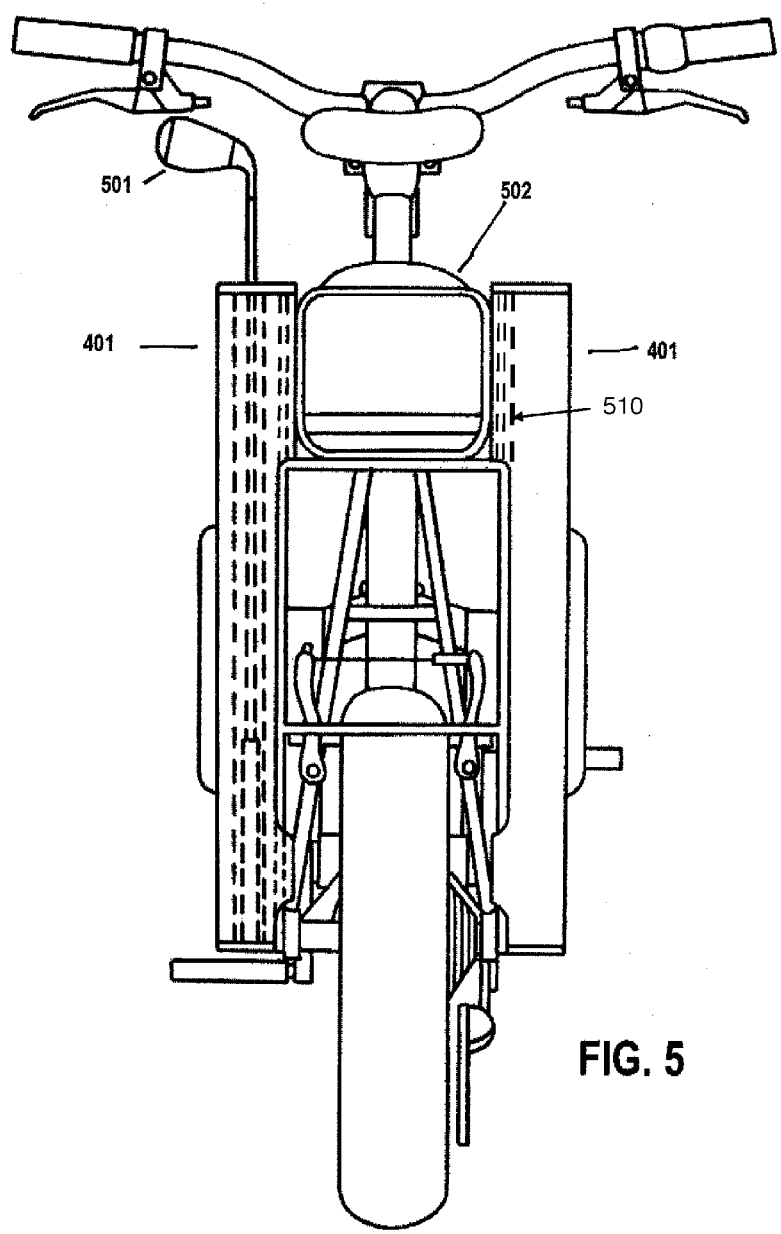
FIG. 5 is a rear view of an embodiment of the present invention.

Referring to FIG. 4 and FIG. 5, golf bag 401 is shown attached to club carrying frame 113. Golf bag 401 is comprised of two, independent sections that connect to vertical supports 301 and extend vertically along the outside length of vertical supports 301. The upper, inward side of golf bag 401 includes a sleeve 510 that is sized to slidingly engage with the U-shape portion of of upper frame 115 that extends above upper platform 302. Each section of golf bag 401 is sized to receive a plurality of golf clubs 501 and may include dividers or tube members to segregate and stabilize golf clubs disposed therein. Each section of golf bag 401 may also include one or more outer pockets 403 that are sized to accommodate typical golf accessories such as balls, gloves, tees, and the like. Because golf bag 401 is a bifurcated design that is attached only to the outside of upper frame 115, upper platform 302 is not covered by golf bag 401. Thus, upper platform 302 is free to accept various accessories such as a drink cooler 502 or a bucket containing sand for divot repairs.

Electric assists for bicycles are well know in the art. Optionally, an electric motor assist can be attached to golf bike 100 to provide, when needed, additional motive force.

The appended drawings and pictures depict these and other aspects of the present invention, and this description is not intended to be limiting, but rather to be representative of at least one preferred embodiment of the invention.

Having described my invention, I claim:

1. A golf bike comprising:
   a. a step-through frame section, said step-through frame section including a top tube with a midpoint, said midpoint having a height above ground in the range of 21 to 26 inches;
   b. a club carrying frame;
   c. a front wheel, said front wheel having a width in the range of 2 to 3 inches and having a diameter in the range of 16 to 24 inches;
   d. a rear wheel, said rear wheel having a width in the range of 2 to 3 inches and having a diameter in the range of 16 to 24 inches;
   e. a front tire, said front tire having a width in the range of 2.5 to 3.5 inches;
   f. a rear tire, said rear tire having a width in the range of 2.5 to 3.5 inches;
   g. a wheelbase, said wheelbase having length in the range of 114 to 121 centimeters;
   h. a bifurcated golf bag attached to said club carrying frame, said club carrying frame including an upper platform and;
   i. a drink cooler disposed upon said upper platform.

2. A golf bike comprising:
   a. a step-through frame section, said step-through frame section including a top tube with a midpoint, said midpoint having a height above ground in the range of 21 to 26 inches;
   b. a club carrying frame;
   c. a front wheel, said front wheel having a width in the range of 2 to 3 inches and having a diameter in the range of 16 to 24 inches;
   d. a rear wheel, said rear wheel having a width in the range of 2 to 3 inches and having a diameter in the range of 16 to 24 inches;
   e. a front tire, said front tire having a width in the range of 2.5 to 3.5 inches;
   f. a rear tire, said rear tire having a width in the range of 2.5 to 3.5 inches;
   g. a wheelbase, said wheelbase having length in the range of 114 to 121 centimeters;
   h. a bifurcated golf bag attached to said club carrying frame, said club carrying frame including an upper platform, and wherein said bifurcated golf bag includes two sections and each of said bifurcated golf bag sections includes a sleeve for attachment to said club carrying frame.

* * * * *